United States Patent
Kozhaya et al.

(10) Patent No.: US 7,200,829 B2
(45) Date of Patent: Apr. 3, 2007

(54) I/O CIRCUIT POWER ROUTING SYSTEM AND METHOD

(75) Inventors: Joseph N. Kozhaya, Essex Junction, VT (US); Patrick M. Ryan, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 10/710,182

(22) Filed: Jun. 24, 2004

(65) Prior Publication Data

US 2005/0289494 A1    Dec. 29, 2005

(51) Int. Cl.
G06F 17/50    (2006.01)

(52) U.S. Cl. .............. 716/12; 716/13; 716/14
(58) Field of Classification Search .......... 716/10, 716/12, 13–14, 8
See application file for complete search history.

(56) References Cited

U.S. PATENT DOCUMENTS

| | | | | |
|---|---|---|---|---|
| 5,644,500 A * | 7/1997 | Miura et al. | ................ | 716/8 |
| 6,086,627 A * | 7/2000 | Bass et al. | ................ | 716/5 |
| 6,202,196 B1 * | 3/2001 | Huang et al. | ................ | 716/14 |
| 6,240,541 B1 * | 5/2001 | Yasuda et al. | ................ | 716/6 |
| 6,305,000 B1 * | 10/2001 | Phan et al. | ................ | 716/5 |
| 6,725,439 B1 * | 4/2004 | Homsinger et al. | ................ | 716/12 |
| 6,854,094 B2 * | 2/2005 | Inui et al. | ................ | 716/2 |
| 7,119,383 B2 * | 10/2006 | Ohayashi et al. | ................ | 257/203 |
| 2002/0095643 A1 * | 7/2002 | Shiratori | ................ | 716/2 |
| 2004/0103387 A1 * | 5/2004 | Teig et al. | ................ | 716/13 |
| 2004/0243958 A1 * | 12/2004 | Bednar et al. | ................ | 716/7 |

\* cited by examiner

*Primary Examiner*—Jack Chiang
*Assistant Examiner*—Suchin Parihar
(74) *Attorney, Agent, or Firm*—Downs Rachlin Martin PLLC (57) ABSTRACT

A method of determining widths and/or routes of I/O power routes between one or more power distribution networks and a plurality of I/O circuits based on IR chop, electromigration, and electrostatic discharge electrical requirements. The method includes initially routing the I/O power routes and then iteratively analyzing the I/O power routes and iteratively incrementing the width of each power route that fails one or more of the electrical requirements until all power routes meet all electrical requirements. Once all power routes meet the electrical requirements, power routing is performed again to re-route any power routes as necessary to accommodate their wider widths. The method may be implemented in a system that includes a power routing tool, an electrical analysis tool, and a tool integrator tat implements an integrated power routing algorithm.

20 Claims, 4 Drawing Sheets

I/O CIRCUIT POWER ROUTING SYSTEM AND METHOD

BACKGROUND OF INVENTION

1. Field of the Invention

The present invention generally relates to the field of integrated circuits. In particular, the present invention is directed to an I/O circuit power routing system and method.

2. Background of the Invention

Thus far, the semiconductor industry has succeeded in pushing forward the famous Moore's law on technology scaling. This continuous push results in future very large scale integration (VLSI) designs characterized by higher integration densities, higher operating frequencies, and reduced feature size. Reduced feature size leads to higher sheet resistivity for the metal wires that connect electrical devices to their corresponding electrical networks. Higher operating frequencies result in an increase in the dynamic power dissipated by the chips. Higher integration densities increase the number of transistors on the chip and accordingly increase the chip power dissipation.

Furthermore, leakage power, also referred to as static power, is increasing significantly from one technology to the next. In an attempt to address the increased power dissipation, as well as address other reliability requirements such as oxide breakdown voltage, the supply voltage is reduced in newer technologies. This reduces the noise margins and makes the designs more sensitive to voltage drops, also known as IR drops. While excessive voltage drops may cause functional failures, less severe voltage drops increase gate delays, which affect chip timing and make it harder to meet a chip's timing requirements.

The trend of increased power dissipation, lower supply voltage, and smaller feature size leads to higher current densities flowing in the power distribution networks of modern VLSI chips. Higher current densities and reduced sheet resistivity raise the chip susceptibility to reliability concerns, such as electromigration (EM) and electrostatic discharge (ESD), both of which can cause physical damage and chip failure.

Presently, a large number of chips are made using designs in which the input/output (I/O) circuits can be placed essentially anywhere on the chip and are not limited to the periphery of the chip. This type of chip is often referred to as a "flip chip." An important aspect of the physical design of flip chips relative to I/O circuits is the sizing and routing of the wiring that connects the I/O circuits to the appropriate on-chip power distribution networks. "Power routing" of I/O circuits is the process of connecting the power service terminals (PSTs) of every I/O circuit (i.e., I/O pins where power is supplied to the I/O circuit) to the power distribution network. The metal wires connecting the I/O PSTs to the power distribution network are referred to as "power routes." By controlling the widths of the I/O power routes, the effective resistance of the power routes, as well as the current densities in those routes, can be controlled to satisfy the electrical requirements of the design. The process of modifying the widths of the power distribution wires, also referred to as "wire sizing," has been discussed in the literature to satisfy EM reliability requirements of generic power mesh structures.

For I/O circuits to function properly and meet their specifications, a set of electrical constraints, defined by either the technology developers or the chip designers, needs to be satisfied. A subset of these constraints related to the power routes of the I/O circuits are checked by the IR, EM, and ESD constraints.

IR checks: Supply currents flowing through metal conductors cause voltage drops across the conductors. Consequently, the voltage at the circuit pins is less than the voltage applied at the module pins. The IR drop checks are defined to guarantee that the voltage drops at the PSTs of the I/O circuits are less than a specified percentage of the supply voltage. This guarantees that the I/O circuits meet their performance specifications, which strongly depend on the value of the voltage at the PSTs of the I/O circuits.

EM checks: Electromigration is an important reliability failure mechanism that is becoming a more serious concern in shrinking technologies. Electromigration is defined as the mass transport of metal ions due to the momentum exchange between the metal ions and the moving electrons that represent the electric current flowing through the metal wires. A direct current in a metal wire running for a substantial period of time eventually causes the formation of voids or hillocks. In circuit terms, a void formation means an open circuit in the wire and a hillock formation means that the wire gets shorted to other wires. Either scenario may cause chip failure. For each technology, the technology developers define maximum EM current density limits as a function of the chip lifetime and temperature. It is then the designer's responsibility to make sure that current densities flowing through the metal wires on the chip are less than the specified technology limits. This is basically what defines the EM checks.

ESD checks: Electrostatic discharge is another important reliability failure mechanism that chip designers need to take into consideration. An ESD event is defined as the transfer of charge between bodies of different electrostatic potential in proximity or through direct contact. There are three different ESD models recognized in the semiconductor industry: (1) human body model; (2) machine model; and (3) charged device model. The difference between these models is the definition of their criteria in terms of how much charge can be injected into the system without damaging chip circuitry. To protect the chip circuitry against an ESD event, ESD clamps are utilized to help conduct a discharge path to the ground network. An ESD clamp is effectively a huge transistor (or diode) that is turned off except in the presence of an ESD event. In the case of an ESD event, the clamp turns on, creating a path for the charge to be drained into the ground network, thus, allowing the safe discharge of the ESD event while avoiding damage to chip circuitry. The ESD check is usually defined in terms of a maximum limit on the effective resistance of the power distribution network (including the power routes) from every I/O circuit to the ESD clamps.

The continual push for high performance and low power designs in current and future technologies makes it more difficult to meet the different electrical requirements of the designs, such as satisfying the IR drop, EM, and ESD electrical requirements. As mentioned, the widths of the power routes of the I/O circuits can be controlled to guarantee the satisfaction of all the electrical constraints. However, the processes of power routing and electrical analysis are typically independent. Most existing techniques rely on generic guidelines for power routing the I/O circuits. These guidelines are usually manually developed by experienced engineers relying on their knowledge of typical operation of I/O circuits and the design of the on-chip power distribution. Such guidelines are usually not I/O instance-specific and they do not necessarily guarantee the satisfaction of the electrical constraints for all I/O circuits. On the other hand, analysis tools have been developed to check for and capture the electrical violations in a design. Such tools utilize techniques that extract and simulate the power distribution networks excited by the different I/O circuits.

Consequently, a major drawback of existing design techniques is that the power routing design step is invoked independently of the electrical analysis design step. Thus, any violations reported by the electrical analysis step are then fixed manually by the designers. This is usually a tedious process that requires a number of iterations that may result in schedule delays. With newer technologies, the electrical constraints are becoming more stringent and consequently, the process of manual fix-up of electrical violations is becoming even more tedious.

SUMMARY OF INVENTION

In one aspect, the present invention is directed to a method of floorplanning an integrated circuit chip. The method includes: a) routing a plurality of power routes corresponding to a plurality of integrated circuits using an initial width for each of the plurality of power routes; b) performing at least one electrical check of the plurality of integrated circuits; c) determining whether any one or more of the plurality of power routes has at least one electrical violation; d) for each one of said plurality of power routes having at least one electrical violation, assigning that one of the plurality of power routes a new width greater than the initial width and e) repeating steps b) and c) at least once using the one or more new widths assigned in step d) and any of the initial widths remaining after step d).

In another aspect, the present invention is directed to a system for floorplanning an integrated circuit chip that includes a plurality of integrated circuits electrically connected to one or more power distribution networks via a corresponding plurality of power routes. The system comprises a power routing tool operatively configured to route the plurality of power routes. An electrical analysis tool operatively configured to perform at least one electrical check on the plurality of integrated circuits and the plurality of power routes. A tool integrator implements an integrated power routing algorithm that performs the steps of: i) routing, using the power routing tool, the plurality of power routes using an initial width for each of the plurality of power routes; ii) performing, using the electrical analysis tool, at least one electrical check of the plurality of integrated circuits; iii) determining whether any one or more of the plurality of power routes has at least one electrical violation; iv) for each one of the plurality of power routes having at least one electrical violation, assigning that one of the plurality of power routes a new width greater than the initial width; and v) repeating steps ii) and iii) at least once using the one or more new widths assigned in step iv) and any of the initial widths remaining after step iv).

BRIEF DESCRIPTION OF DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
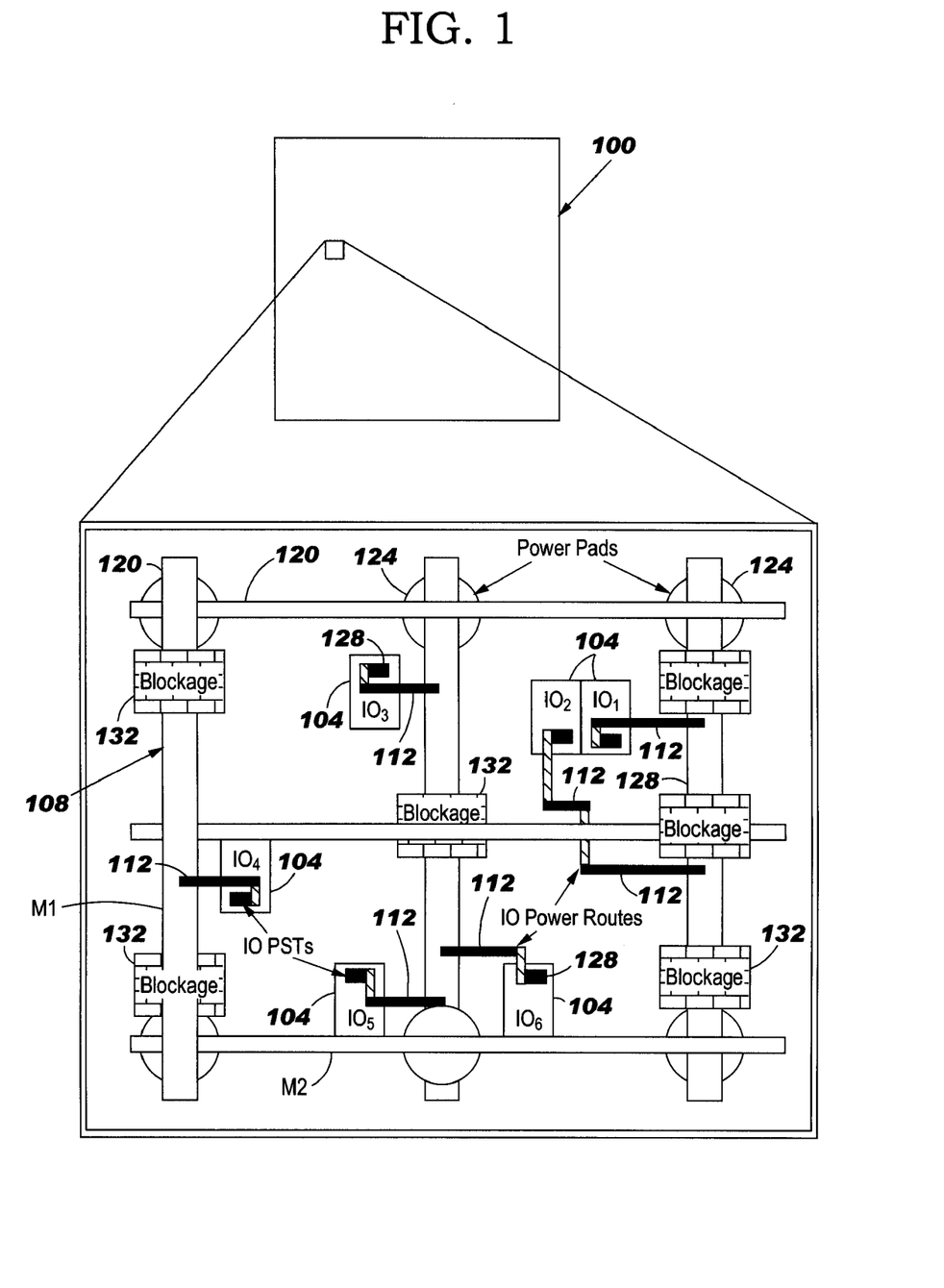
FIG. 1 is a high-level schematic diagram of an integrated circuit chip made using an integrated power routing system and method of the present invention.

Referring now to the drawings, FIG. 1 illustrates an integrated circuit chip 100 that contains a plurality of I/O circuits 104 each electrically coupled to a power distribution network 108 via a corresponding power route 112. Power routes 112 have been sized and/or routed using an integrated power routing system and method of the present invention, e.g., system 300 of FIG. 3 and method 400 of FIG. 4. Integrated power routing system 300 and integrated power routing method 400 are each described below in detail. However, in order to provide a context for a macro placement system and method of the present invention, chip 100 is described first.

Chip 100 may be any type that utilizes one or more power distribution networks 108 and I/O circuits 104 that need to be power routed to one of the power distribution networks. Chip 100 may be of any type, e.g., an application specific integrated circuit (ASIC) chip, processor, memory, system on chip or controller, among others. Those skilled in the art will readily appreciate that chip 100 may be designed to perform any functions typical of integrated circuits and that the type of chip is generally not relevant to the broad scope of the present invention. Power distribution network 108 may comprise a plurality of wires 120 located on one or more metal levels, e.g., M1 and M2, of chip 100 and a plurality of power pads 124 for connecting the chip to an external power supply (not shown). Wires 120 may be arranged in any manner suitable for a particular design, such as the rectangular grid arrangement shown.

Figure 2:
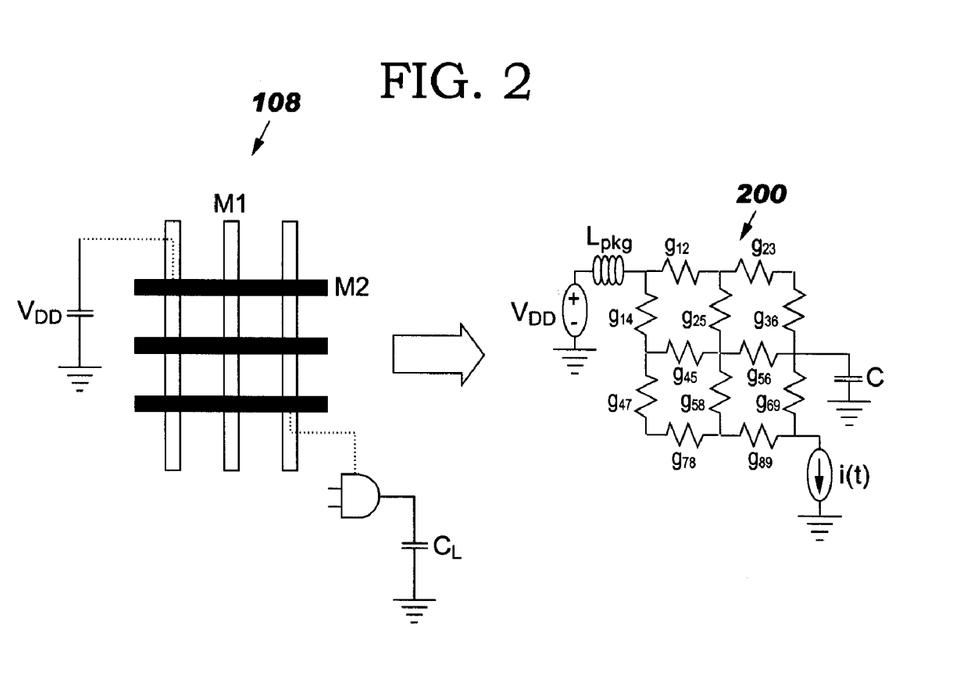
FIG. 2 is a schematic diagram illustrating the modeling of the power distribution network of FIG. 1.

It is clear from the discussion in the background section that power distribution networks, such as power distribution network 108, are becoming performance limiting factors in modern chip designs. In addition to IR, EM, and ESD concerns, transient power supply collapse is a serious concern that may cause chip timing violations and potentially functional failure. In order to capture the transient response of the system, power distribution network 108 may be modeled as a linear RLC network. Correspondingly, power pads 124 may be modeled as ideal voltage sources, and power distribution network 108 may be excited by time-varying current sources that capture the switching behavior of the active circuits. These current sources are applied at the locations of the circuits they represent. Such a model 200 is illustrated in FIG. 2.

Referring again to FIG. 1, although each power distribution network may be modeled as an RLC network, for simplicity, power distribution network 108 may, if desired, be modeled as a resistive model, since DC simulation is sufficient for checking IR, EM, and ESD requirements. This significantly simplifies, and speeds up, the modeling, analysis, and checking for any electrical violations. Correspondingly, the power pads 124 may still be modeled as ideal voltage sources and the active circuits may be modeled as DC current sources.

Power routes 112 of I/O circuits 104 typically do not follow a grid structure, as power distribution network 108 may. Often, I/O power routes 112 look more like signal routes (not shown). Thus, there is no regular power distribution grid that I/O circuits 104 simply tap into. Instead, a connection, i.e., a corresponding one of power routes 112, has to be routed from the corresponding PST 128 to on-chip power distribution network 108 of the voltage domain to which the respective I/O circuit 104 belongs. FIG. 1 also shows various blockages 132, each of which is a physical area on chip 100 where I/O circuits 104 cannot be placed or where power routes 112 cannot pass through because some other circuit(s) is/are placed in that area.

Given a model, e.g., model 200 (FIG. 2), of power distribution network 108, modified nodal analysis can be applied to extract the system of equations represented by Equation {2}.

$$Gx = I \qquad \{2\}$$

where G is a conductance matrix, x is a vector of node voltages, and I is a set of current stimulus exciting the system. The solution of the system of Equation {2} provides the voltages at all the nodes and the currents flowing in all the branches. A node is defined as the intersection of two adjacent (or same) metal layers of like polarity (e.g., VDD, GND, or VDDx). A branch is the metal segment between two nodes. Node voltages are required for IR and ESD checking. Branch currents, on the other hand, are required for EM checking.

Figure 3:
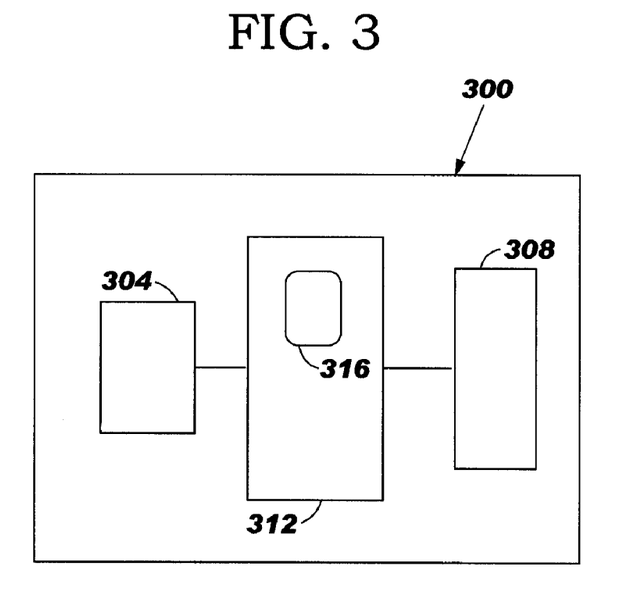
FIG. 3 is a high-level schematic diagram of an integrated power routing system of the present invention.

Referring to FIG. 3, and also to FIG. 1, FIG. 3 illustrates an integrated power routing system 300 of the present invention that may be used to automatically size and/or route I/O power routes, e.g., power routes 112 of FIG. 1. Integrated power routing system 300 may include, among other things, a power routing tool 304, an electrical analysis tool 308, and a tool integrator 312 that controls the power routing and electrical analysis tools in an iterative manner so as to automatically size and/or route the I/O power routes so as to meet IR, EM, and ESD and other requirements. Power routing tool 304 may be any suitable tool known in the art for routing I/O power routes 112.

Similarly, electrical analysis tool 308 may be any suitable tool for electrical analysis of I/O circuits, power network(s), power routes and other elements. An example of an electrical analysis tool that may be adapted for use as electrical analysis tool 308 in integrated power routing system 300 of the present invention is VOLTAGE STORM®, available from Cadence Design Systems, Inc. of San Jose, Calif. Of course, each of power routing tool 304 and electrical analysis tool 308 may be custom made and/or integrated with one another. Those skilled in the art readily understand the design and use of power routing and electrical analysis tools 304, 308, such that they need not be described herein in any further detail in order for those skilled in the art to make and use the present invention to its fullest scope.

Tool integrator 312 may be operatively configured to perform an integrated power routing algorithm 316 that utilizes the functionality of power routing tool 304 and electrical analysis tool 308 in an iterative manner to arrive at suitable widths (W) and/or routings for I/O power routings 112 being routed using integrated power routing system 300. The functions of tool integrator 312 are described below in connection with method 400 of FIG. 4. It is noted that tool integrator 312 need not be separate and distinct from power routing tool 304 and/or electrical analysis tool 308 as shown. Rather, tool integrator 312 may be integrated into one, the other, or both of power routing and electrical analysis tools 304, 308. Tool integrator 312 is shown as separate from power routing and electrical analysis tools 304, 308 merely to illustrate its separateness in terms of function.

Figure 4:
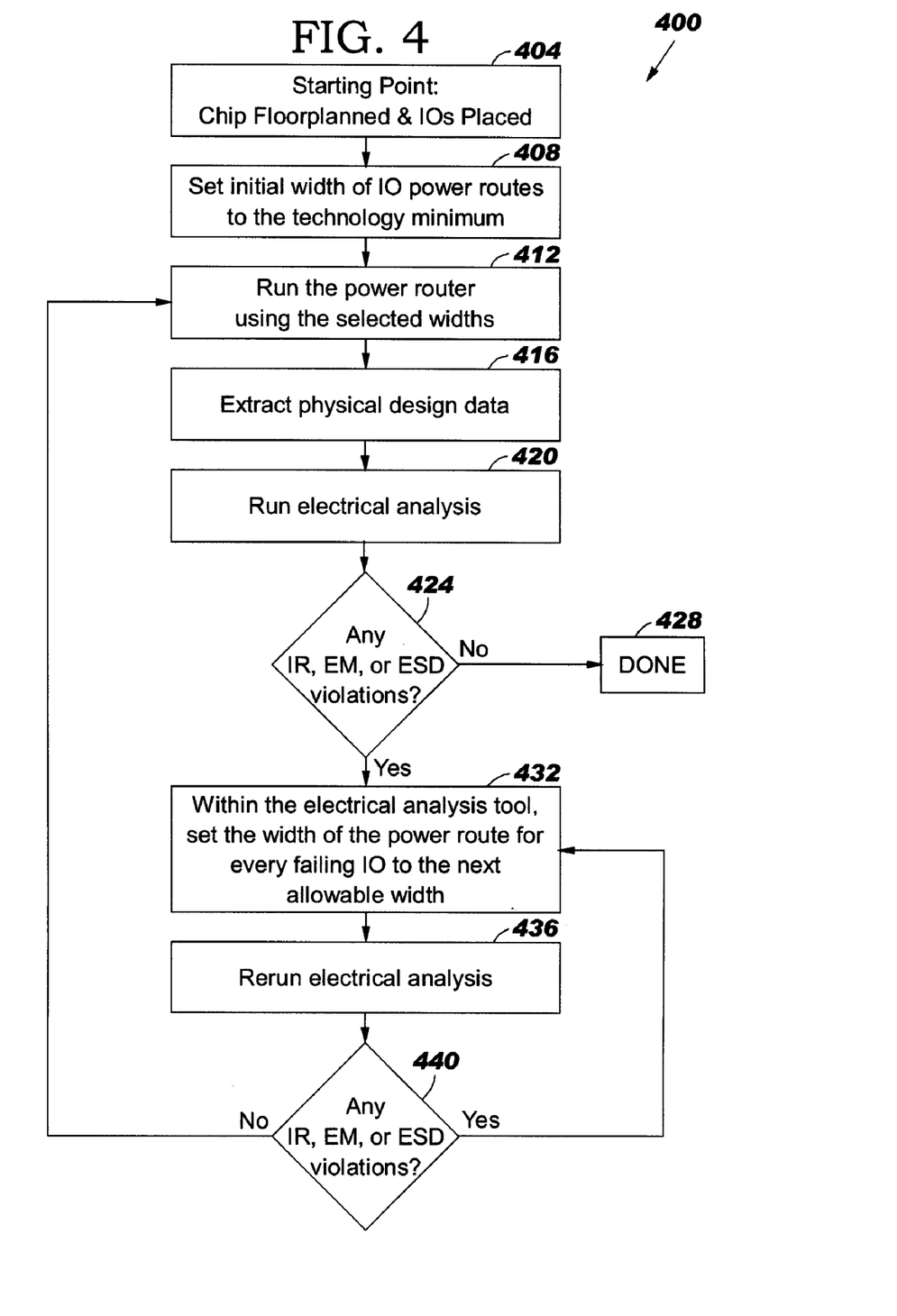
FIG. 4 is a flow diagram illustrating an integrated power routing method of the present invention that may be implemented in the integrated power routing system of FIG. 3.

Referring to FIG. 4, and also to FIGS. 1 and 3, FIG. 4 illustrates an integrated power routing method 400 of the present invention that may be implemented by tool integrator 312 (FIG. 3) to automatically size and route I/O power routes, e.g., power routes 112 of FIG. 1. As those skilled in the art will appreciate, method 400, and other methods in accordance with the present invention, may be executed in any suitable software/hardware context.

At step 404, method 400 may be started. A typical starting point for method 400 occurs once chip 100 has been floorplanned and all I/O circuits 104 have been assigned and placed. However, it is noted that, depending upon the type of chip 100, the starting point may be at another stage of design. For example, if chip 100 is of a system on chip design, starting point may occur at a time when a particular region of the chip has been floorplanned and corresponding I/O circuits 104 have been assigned and placed therein.

At step 408, tool integrator 312, e.g., via power routing tool 304, may assign to each power route 112 a minimum width recommended by the technology used to make chip 100, or portions of the chip, at issue. Those skilled in the art will readily understand how to arrive at the value of minimum power route width applicable for the technology they will use.

At step 412, tool integrator 312 may cause power routing tool 304 to perform an initial power routing using the minimum widths assigned at step 408. The result of this initial power routing is a set of routes for power routes 112 based on these power routes being the minimum width possible. At step 416, tool integrator 312 extracts the physical design data, e.g., lengths of power routes 112, connection locations to power distribution network 108 and placement of I/O circuits 104, needed for electrical analysis tool 308 to perform an electrical analysis of the power routes. At step 420, tool integrator 312 may cause electrical analysis tool 308 to perform an electrical analysis of I/O circuits 104 and power routes 112 to determine, perhaps among other things, whether any one or more IR, EM, and ESD violations exist.

At step 424, electrical analysis tool 308 or tool integrator 312 may determine whether any power route 112 has any IR, EM, and ESD violations. If not, at step 428, the routing of I/O power routes 112 is done, and routes and widths of the power routes just analyzed at step 420 may be used in the final floorplan. In this scenario, tool integrator 312 may terminate integrated power routing algorithm 316. If, on the other hand, electrical analysis tool 308 reports one or more IR, EM, and ESD violations, then the electrical analysis tool or tool integrator 312 may create a list of all I/O circuits 104 that fail any of the IR, EM, and ESD checks.

If it is determined at step 424 that one or more IR, EM, and ESD violations exist, electrical analysis tool 308 or tool integrator 312 may, at step 432, assign an increased width to power route(s) 112 corresponding to the one(s) of I/O circuits 104 having one or more violations. Each existing width that failed may be increased by any incremental amount, such as an incremental amount dictated by the technology used to fabricate chip 100. For example, in one technology in which the minimum width is 6 μm, the incremental step may be 2 μm, such that the next width is 8

μm. At this point, the routes of power routes 112 may be assumed to be the same routes as just determined in step 412.

At step 436, tool integrator 312 may cause electrical analysis tool 308 to re-run using the new widths assigned to the failing I/O circuits 104 in step 432 and all of the remaining original minimum widths. At step 440, similar to step 424, electrical analysis tool 308 or tool integrator 312 may determine whether any power route 112 has any IR, EM, and ESD violations. If not, method 300 may loop back to step 412 to re-run power routing tool 304 so that power routes 112, if any, may be re-routed in the event that any of the width increases made in step 432 result in a new interference with one or more of blockages 132 or other power route(s). Once any power routes 112 have been re-routed at step 412, method 400 may continue with steps 416, 420, 424, 432, 436 and 440 as necessary until the process ends at step 428 with one or more of the power routes being resized and/or re-routed until no IR, EM, and ESD violations occur. Once step 428 has been reached, the routes and widths of power routes 112 determined in the most recent power routing of step 412 may be used in the final floorplan. At this point, tool integrator 312 may terminate integrated power routing algorithm 316.

If, on the other hand, electrical analysis tool 308 reports one or more IR, EM, and ESD violations at step 440, then the electrical analysis tool or tool integrator 312 may create a list of all I/O circuits 104 that fail any of the IR, EM, and ESD checks. In this case, method 400 may proceed back to step 432 so that new greater widths may be assigned to power routes 112 corresponding to the one or more IR, EM, and ESD violations. Method 400 may loop through steps 432, 436, 440 and back to step 432 until electrical analysis tool 308 or tool integrator 312 does not find any more IR, EM, and ESD violations.

As explained immediately above in the flow of method 400, integrated power routing algorithm 316 involves iterations within electrical analysis tool 308 as well as iterations between the electrical analysis tool and power routing tool 304. Integrated power routing algorithm 316 terminates when all the electrical specifications are satisfied for all I/O circuits 104. Using method 400, electrical analysis tool 308 is automatically and iteratively invoked so as to arrive at a first approximation of the optimal widths for power routes 112 so as to guarantee that all electrical constraints are satisfied. This reduces the number of iterations between power routing tool 304 and electrical analysis tool 308, thereby reducing churn in satisfying the electrical constraints.

Furthermore, method 400 targets the power routing of each individual I/O circuit 104 independently. Existing techniques break up I/O circuits 104 into classes and define different power route widths for different classes. However, the electrical constraints of different I/O circuits 104 of the same class may be different. This is so because the electrical constraints required to be satisfied by an I/O circuit 104 depend on the current drawn by that I/O circuit and the location of that I/O circuit on chip 100. The I/O current, in turn, depends on the specific loading conditions and switching activity of that specific I/O circuit 104. Thus, defining a power route width based on an I/O class may result in some I/O circuits 104 having wider power routes 112 than necessary to satisfy the electrical constraints. This is an undesirable result since wider power routes 112 consume wiring resources that make it harder to efficiently wire chip 100. Hence, it is important to define the minimum power route width for each I/O circuit 104 necessary to satisfy the electrical constraints of that I/O circuit.

EXAMPLE

In this example, four test cases, referred to as TC1, TC2, TC3, and TC4, are considered in connection with implementing an integrated power routing method of the present invention, e.g., method 400, in connection with IR requirements. However, those skilled in the art will readily understand the modifications necessary to implement this method in connection with EM and ESD requirements as well.

The number of I/O circuits in each of test cases TC1, TC2, TC3, and TC4 is about 150 I/O circuits, as shown in Table I.

TABLE I

| Test Case | No. of I/O Circuits | No. of Failing I/O Circuits vs. Power Route Width | | | |
|---|---|---|---|---|---|
| | | 6 μm | 8 μm | 12 μm | 16 μm |
| TC1 | 159 | 26 | 10 | 3 | 0 |
| TC2 | 152 | 29 | 10 | 0 | 0 |
| TC3 | 157 | 25 | 10 | 4 | 1 |
| TC4 | 145 | 26 | 11 | 2 | 0 |

The supply voltage is 1.5V for each of test cases TC1, TC2, TC3 and TC4. The other inputs for this example are the currents drawn by the various I/O circuits. For purposes of this example, it is assumed that each I/O circuit is drawing 30.0 mA of current from the power supply. In practice, the current demand for each I/O circuit may be obtained by running SPICE simulations under accurate loading conditions. Those skilled in the art will be familiar with SPICE, which is an acronym for "Simulation Program with Integrated Circuit Emphasis," and the variety of SPICE implementations commercially available. Note that in such a scenario, the current demand for the various I/O circuits may be different depending on their loading conditions. However, in order to illustrate the usefulness of the present invention, it is sufficient to assume that all I/O circuits draw equal currents, each having the value of 30.0 mA. Furthermore, it is noted that the current metric suitable for IR drop analysis may be different than the current metrics suitable for EM or ESD analysis.

Typically, the allowed power route widths are limited to a small set of discrete widths that the power routing tool, e.g., power routing tool 304 of FIG. 3, can use when connecting the PSTs of the I/O circuits to a corresponding power distribution network. The results presented in this section are obtained using four possible widths for the power routes, 6 μm, 8 μm, 12 μm and 16 μm. As mentioned earlier, the integrated power routing algorithm, e.g., algorithm 316 of FIG. 3, typically starts with the assumption that the width of the power route for every I/O circuit is the minimum possible width, which, in this example, is 6 μm. Given the initial minimum-width power routes, an electrical analysis tool, e.g., electrical analysis tool 308 of FIG. 3, extracts the necessary data and runs the simulations to identify the I/O circuits failing the electrical requirements. The check that is used in the present example is an IR drop of more than 5% of the supply voltage.

For all the I/O circuits failing this IR check, the electrical analysis tool attempts the second larger width and reruns the simulation. The integrated power routing algorithm continues iterating the electrical analysis with one or more new power route widths until all requirements are satisfied, that is, all I/O circuits have an IR drop of less than 5% of the supply voltage. Table I shows the number of I/O circuits failing the IR drop requirement when considering the different possible widths. The first column corresponds to the different test cases T1, T2, T3, and T4. The second column shows the total number of I/O circuits in each test case. The third column reports the number of I/O circuits that fail the IR drop requirement using the initial power route width of 6 µm. Then, columns 4, 5, and 6 report the number of I/O circuits failing their drop requirement after increasing the power route width to 8 µm, 12 µm, and 16 µm respectively.

Note that for TC3, one I/O circuit still fails the IR requirement even after the maximum possible width is considered. This usually occurs when an I/O circuit is placed in an area congested with other I/O circuits, all of which draw power from the same location of the power distribution network. In such cases, the IR drop violation may be fixed by either changing the location of that I/O circuit or re-routing its power route.

Figure 5:
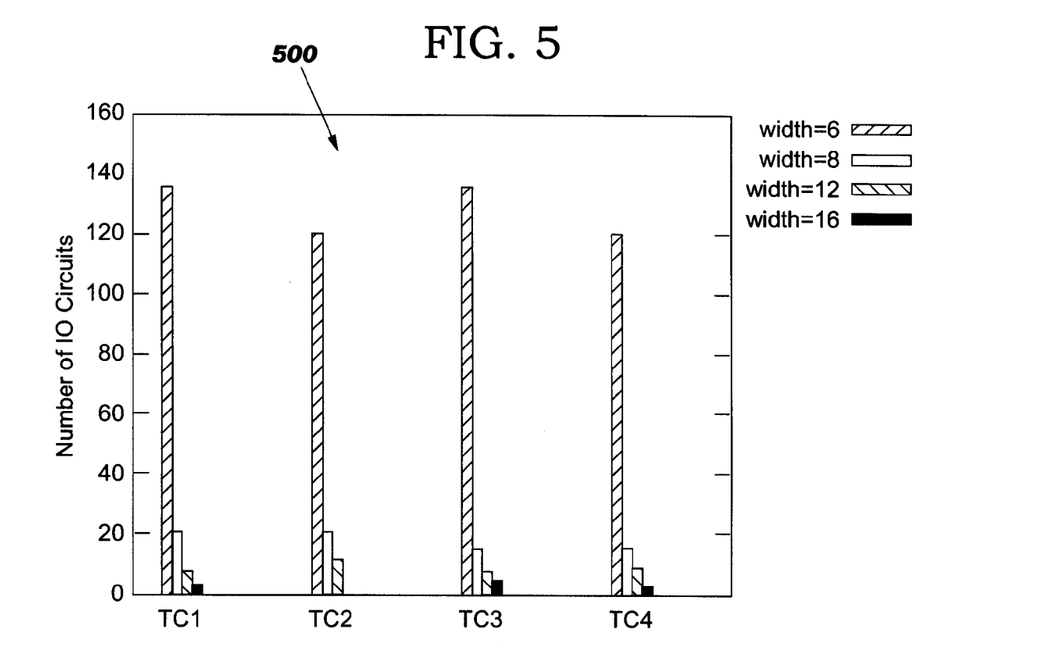
FIG. 5 is a histogram of the number of I/O power routes of each width after a first iteration of a power routing method of the present invention for each of four test cases TC1, TC2, TC3, and TC4.

Observe that the results shown in Table I correspond to one iteration between the power routing tool and the electrical analysis tool. Basically, the power routing tool started with the minimum width of 6 µm for all I/O power routes. The electrical analysis tool, in turn, provided a set of recommendations of increasing the widths of certain I/O circuits. FIG. 5 shows a histogram 500 of the number of I/O circuits of each possible power route width as recommended by the electrical analysis tool after the first iteration.

After the electrical analysis tool is run, the power routing tool was invoked to apply the power route widths recommended by the electrical analysis tool. Then, extraction and simulation is repeated again by the electrical analysis tool. The results for these iterations between the power routing tool and the electrical analysis tool are summarized in FIG. 6, which shows a graph 600 of the number of failing I/O circuits after each iteration for all four test cases TC1, TC2, TC3, and TC4. Note that iteration 0 corresponds to the initial power routes, which, at that point, all have the minimum width of 6 µm.

Figure 6:
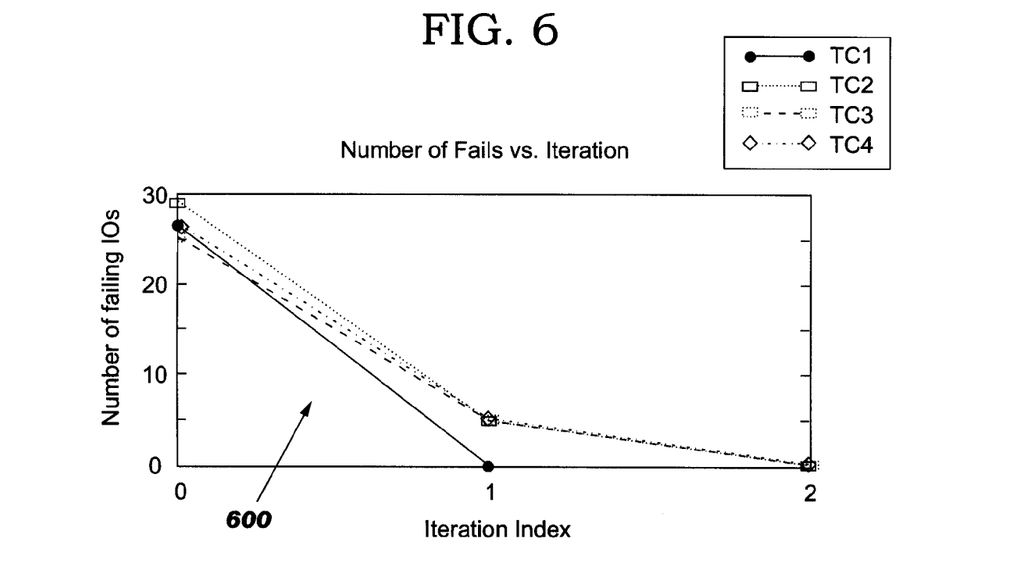
FIG. 6 is a graph of number of failed power routes versus an iteration index for test cases TC1, TC2, TC3, and TC4.

Observe that TC1 has no violations after iteration 1. Test cases TC2, TC3, and TC4, however, still have four violations each after iteration 1 and require an additional iteration. The reason that more than one iteration may be needed is that the paths of the power routes may change for some I/O circuits. The power router will attempt to follow the minimum distance path from the I/O circuit to the power distribution network. However, as mentioned above, due to blockage and spacing requirements any one of the power routes may have to follow a different path when its width has been increased.

Finally, it is noted that the run time overhead of the proposed approach is minimal. The CPU time required by the power routing tool is equivalent to any regular run. The overhead of the approach is really introduced in the electrical analysis tool as the integrated power routing algorithm tries the different possible widths before providing recommendations for another iteration of power routing tool. For all four test cases TC1, TC2, TC3, and TC4, this overhead is found to be negligible. The run time of each iteration of the electrical analysis tool is less than one second and the memory required is less than 30 MB.

In view of the foregoing, it is clear that the present invention offers an advantage in reducing the number of iterations between the power routing tool and the electrical analysis tool. Furthermore, it offers an automated solution that results in power routes that satisfy all electrical requirements.

Although the invention has been described and illustrated with respect to an exemplary embodiment thereof, it should be understood by those skilled in the art that the foregoing and various other changes, omissions and additions may be made therein and thereto, without parting from the spirit and scope of the present invention.

The invention claimed is:

1. A method of floorplanning an integrated circuit chip in a technology, comprising in the following order the steps of:
   a) routing a plurality of non-grid power routes corresponding to a plurality of integrated circuits using an initial width for each of said plurality of non-grid power routes, each of said non-grid power routes extending between a power distribution network and a corresponding respective one of said plurality of integrated circuits;
   b) performing at least one electrical check of said plurally of integrated circuits;
   c) determining whether any one or more of said plurality of non-grid power routes has at least one electrical violation;
   d) reporting, to a list, a number of integrated circuits that have at least one electrical violation;
   e) for each one of said plurality of non-grid power routes having at least one electrical violation, assigning that one of said plurality of non-grid power routes a new width greater than said initial width;
   f) prior to re-routing said plurality of non-grid power routes, repeating steps b), c) and d) at least once using the one or more new widths assigned in step e) and any of said initial widths remaining after step e); and
   f) re-routing said plurality of non-grid power routes using the one or more new widths assigned in step e).

2. A method according to claim 1, wherein step e) includes incrementing said initial width by an incremental step characteristic of the technology.

3. A method according to claim 1, wherein step a) includes routing a plurality of non-grid I/O power routes corresponding to a plurality of I/O circuits.

4. A method according to claim 1, wherein the chip is made using at least one predetermined technology and step a) includes routing said plurality of non-grid power routes using a minimum width available in the at least one predetermined technology.

5. A method according to claim 1, wherein step b) includes performing at least one check from the group consisting of an IR check, an EM check, and an ESD check.

6. A method according to claim 1, wherein step b) includes performing an IR check, an EM check, and an ESD check.

7. A method according to claim 1, comprising performing step a) in a power routing tool.

8. A method according to claim 1, comprising performing step b) with an electrical analysis tool.

9. A computer readable medium containing computer executable instructions implementing a method of floorplanning an integrated circuit chip in a technology, the instructions comprising:
   a) a first set of instructions for routing a plurality of non-grid power routes corresponding to a plurality of integrated circuits using an initial width for each of said plurality of non-grid power routes;
   b) a second set of instructions for performing at least one electrical check of said plurality of integrated circuits;
   c) a third set of instructions for determining whether any one or more of said plurality of non-grid power routes has at least one electrical violation;

d) a fourth set of instructions for reporting, to a list, a number of integrated circuits that have at least one electrical violation.
e) a fifth set of instructions that, for each one of said plurality of non-grid power routes having at least one electrical violation, assigns that one of said plurality of non-grid power routes a new width greater than said initial width; and
f) a sixth set of instructions for implementing an integrated power routing algorithm that repeats, at least once prior to re-routing said plurality of non-grid power routes and after said fourth set of instructions has assigned at least one said new width, at least the steps of:
  i) performing at least one electrical check of said plurality of integrated circuits;
  ii) determining whether any one or more of said plurality of non-grid power routes has at least one electrical violation; and
  iii) re-routing said plurality of non-grid power routes using the one or more new widths assigned in step e).

10. A computer readable medium according to claim 9, wherein said fourth set of instructions increments said initial width by an incremental step characteristic of the technology.

11. A computer readable medium according to claim 9, wherein said first set of instructions includes instructions for routing a plurality of non-grid I/O power routes corresponding to a plurality of I/O circuits.

12. A computer readable medium according to claim 9, wherein the chip is made using at least one predetermined technology and said first set of instructions includes instructions for routing said plurality of non-grid power routes using a minimum width available in the at least one predetermined technology.

13. A computer readable medium according to claim 9, wherein said second set of instructions includes instructions for performing at least one check from the group consisting of an IR check, an EM check, and an ESD check.

14. A computer readable medium according to claim 9, wherein said second set of instructions includes instructions for performing an IR check, an EM check, and an ESD check.

15. A system for floorplanning an integrated circuit chip that includes a plurality of integrated circuits electrically connected to one or more power distribution networks via a corresponding plurality of non-grid power routes, comprising:
a) a power routing tool operatively configured to route the plurality of non-grid power routes;
b) an electrical analysis tool operatively configured to perform at least one electrical check on the plurality of integrated circuits and the plurality of non-grid power routes and reporting to a list, a number of integrated circuits that have at least one electrical violation; and
c) a tool integrator implementing an integrated power routing algorithm that performs the steps of:
  i) routing, using said power routing tool, the plurality of non-grid power routes using an initial width for each of the plurality of non-grid power routes;
  ii) performing, using said electrical analysis tool, at least one electrical check of the plurality of integrated circuits;
  iii) determining whether any one or more of the plurality of non-grid power routes has at least one electrical violation;
  iv) for each one of the plurality of non-grid power routes having at least one electrical violation, assigning that one of the plurality of non-grid power routes a new width greater than said initial width; and
  v) prior to re-routing said plurality of non-grid power routes, repeating steps ii) and iii) at least once using the one or more new widths assigned in step iv) and any of said initial widths remaining after step iv).

16. A system according to claim 15, wherein said electrical analysis tool is operatively configured to perform at least one check from the group consisting of an IR check, an EM check, and an ESD check.

17. A system according to claim 15, wherein electrical analysis tool is operatively configured to perform an IR check, an EM check, and an ESD cheek.

18. A system according to claim 15, wherein said integrated power routing algorithm additionally performs, following step v), the step of routing the plurality of non-grid power routes using the one or more new widths assigned in step iv) and any of said initial widths remaining after step iv).

19. A system according to claim 15, wherein the chip is made using at least one predetermined technology and step i) includes routing the plurality of non-grid power routes using a minimum width available in the at least one predetermined technology.

20. A system according to claim 15, wherein said integrated power routing algorithm additionally performs, following step i), the step of extracting physical data from said power routing tool for use by said electrical analysis tool in step ii).

* * * * *